US011665705B2

(12) United States Patent
Wu et al.

(10) Patent No.: US 11,665,705 B2
(45) Date of Patent: May 30, 2023

(54) TWO-STAGE PIGGYBACK DOWNLINK CONTROL INFORMATION (DCI)

(71) Applicant: QUALCOMM Incorporated, San Diego, CA (US)

(72) Inventors: Qiang Wu, San Diego, CA (US); Iyab Issam Sakhnini, San Diego, CA (US); Mehmet Izzet Gurelli, San Diego, CA (US); Jun Ma, San Diego, CA (US); Ahmed Abdelaziz Ibrahim Abdelaziz Zewail, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 17/235,759

(22) Filed: Apr. 20, 2021

(65) Prior Publication Data

US 2021/0329680 A1    Oct. 21, 2021

Related U.S. Application Data

(60) Provisional application No. 63/012,782, filed on Apr. 20, 2020.

(51) Int. Cl.
*H04W 72/12* (2023.01)
*H04W 72/23* (2023.01)
*H04L 1/00* (2006.01)

(52) U.S. Cl.
CPC ........... *H04W 72/23* (2023.01); *H04L 1/0013* (2013.01)

(58) Field of Classification Search
CPC ... H04L 1/1864; H04L 1/1812; H04L 1/0041; H04L 1/0072; H04L 1/0061; H04L 5/0007; H04L 1/0057; H04W 72/042; H04W 72/1289; H03M 13/356; H03M 13/091; H03M 13/09; H03M 13/13
See application file for complete search history.

(56) References Cited

U.S. PATENT DOCUMENTS

| | | | |
|---|---|---|---|
| 10,785,012 B2* | 9/2020 | Pelletier | H04L 5/0094 |
| 11,316,615 B2* | 4/2022 | Park | H04L 1/0026 |
| 11,388,741 B2* | 7/2022 | Takeda | H04L 1/1896 |
| 2018/0123769 A1* | 5/2018 | Pelletier | H04L 5/0094 |
| 2019/0306838 A1* | 10/2019 | Hui | H04L 1/0041 |
| 2020/0396760 A1 | 12/2020 | Yi et al. | |
| 2021/0045181 A1* | 2/2021 | Li | H04L 5/0005 |
| 2021/0176765 A1* | 6/2021 | Iyer | H04B 7/0421 |
| 2021/0266941 A1* | 8/2021 | Park | H04L 27/2607 |
| 2021/0399859 A1* | 12/2021 | Takeda | H04W 72/04 |
| 2022/0052824 A1* | 2/2022 | Kim | H04L 1/1896 |

(Continued)

*Primary Examiner* — Jung Liu
(74) *Attorney, Agent, or Firm* — Seyfarth Shaw LLP

(57) ABSTRACT

A method of wireless communication by a user equipment (UE) includes receiving a first stage of piggyback downlink control information (DCI). The first stage includes scheduling information for a second stage of piggyback DCI. The method also includes receiving the second stage in accordance with the scheduling information. The second stage includes component DCIs. The first and second stages are separately decoded. A method of wireless communication by a base station includes transmitting a first stage of piggyback DCI. The base station also transmits the second stage in accordance with the scheduling information. The second stage includes component DCIs. The first and second stages are separately coded.

30 Claims, 10 Drawing Sheets

(56) References Cited

U.S. PATENT DOCUMENTS

2022/0053551 A1* 2/2022 Ko .......................... H04W 4/70
2022/0131643 A1* 4/2022 Park .................. H04W 72/0413
2022/0209924 A1* 6/2022 Yang .................... H04L 1/1854

* cited by examiner

DL-Centric Slot

TWO-STAGE PIGGYBACK DOWNLINK CONTROL INFORMATION (DCI)

CROSS-REFERENCE TO RELATED APPLICATION

The present application claims the benefit of U.S. Provisional Patent Application No. 63/012,782, filed on Apr. 20, 2020, and titled "TWO-STAGE PIGGYBACK DOWNLINK CONTROL INFORMATION (DCI)," the disclosure of which is expressly incorporated by reference in its entirety.

FIELD OF THE DISCLOSURE

Aspects of the present disclosure generally relate to wireless communications, and more particularly to techniques and apparatuses for including two-stage piggyback downlink control information (DCI).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE), includes receiving a first stage of piggyback downlink control information (DCI). The first stage includes scheduling information for a second stage of piggyback DCI. The method further includes receiving the second stage in accordance with the scheduling information. The second stage includes component DCIs. The first stage and second stage are separately decoded.

In other aspects of the present disclosure, a method of wireless communication by a base station, includes transmitting a first stage of piggyback downlink control information (DCI). The first stage includes scheduling information for a second stage of piggyback DCI. The method further includes transmitting the second stage in accordance with the scheduling information. The second stage includes component DCIs. The first stage and second stage are separately coded.

Other aspects of the present disclosure are directed to a user equipment (UE) for wireless communication having a memory, and one or more processors operatively coupled to the memory. The memory and the processor(s) are configured to receive a first stage of piggyback downlink control information (DCI). The first stage includes scheduling information for a second stage of piggyback DCI. The memory and the processor(s) are configured to receive the second stage in accordance with the scheduling information. The second stage includes component DCIs. The first stage and second stage are separately decoded.

Still other aspects of the present disclosure are directed to a base station for wireless communication having a memory, and one or more processors operatively coupled to the memory. The memory and the processor(s) are configured to transmit a first stage of piggyback downlink control information (DCI). The first stage includes scheduling information for a second stage of piggyback DCI. The memory and the processor(s) are further configured to transmit the second stage in accordance with the scheduling information. The second stage includes component DCIs. The first stage and second stage are separately coded.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description, may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
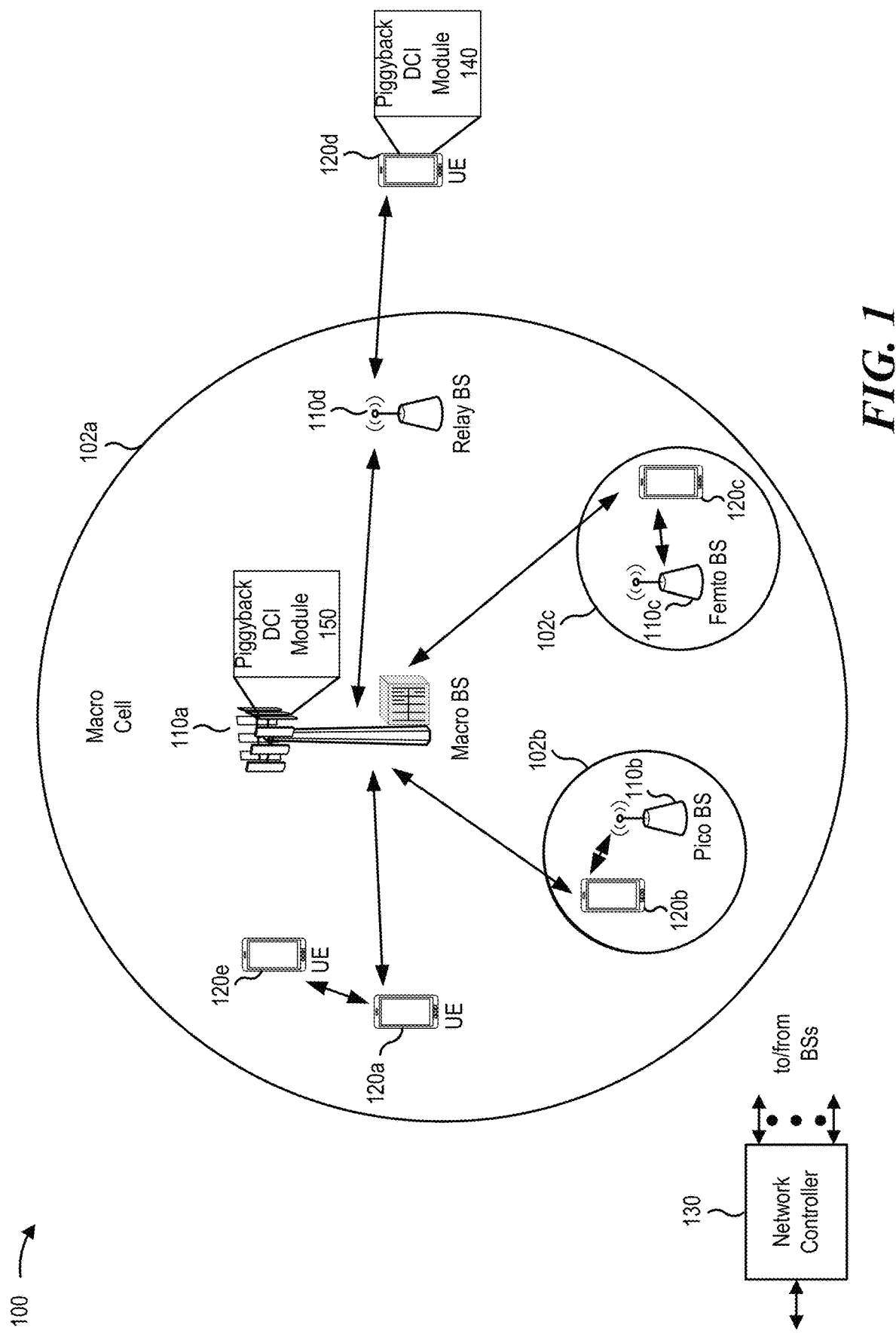
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Piggyback downlink control information (DCI) on physical downlink shared channel (PDSCH) has been proposed to reduce physical downlink control channel (PDCCH) monitoring occasions. It can be applied on dynamic PDSCH as well as semi-persistently scheduled (SPS) PDSCH. When piggyback DCI is applied to an SPS PDSCH, there is no downlink (DL) grant for the SPS PDSCH. Therefore, piggyback DCI can be configured by the radio resource control (RRC) configuration for the SPS PDSCH. However, the number of component DCIs is dynamic, while RRC configuration is static.

According to the present disclosure, a two-stage design of piggyback DCI is presented. In these aspects, piggyback DCI is composed of two separately coded parts. The first stage carries the scheduling information for the second stage. The second stage carries the component DCIs. The second stage scales with the number of component DCIs. RRC configuration may carry the scheduling information for the first stage. The two-stage piggyback DCI design also applies to the dynamic PDSCH case. In this case, the control resource set (CORESET) DCI carries the scheduling information for the first stage.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110.

The UEs 120 may include a piggyback DCI module 140. For brevity, only one UE 120d is shown as including the piggyback DCI module 140. The piggyback DCI module 140 may receive a first stage of piggyback downlink control information (DCI). The first stage includes scheduling information for a second stage of piggyback DCI. The piggyback DCI module 140 may also receive the second stage in accordance with the scheduling information. The second stage includes component DCIs. The first stage and second stage are separately decoded.

The base stations 110 may include a piggyback DCI module 150. For brevity, only one base station 110 is shown as including the piggyback DCI module 150. The piggyback DCI module 150 may transmit a first stage of piggyback downlink control information (DCI). The first stage includes scheduling information for a second stage of piggyback DCI. The piggyback DCI module 150 may also transmit the second stage in accordance with the scheduling information. The second stage includes component DCIs, and the first stage and second stage are separately coded.

As indicated above, FIG. 1 is provided merely as an example. Other examples may differ from what is described with regard to FIG. 1.

Figure 2:
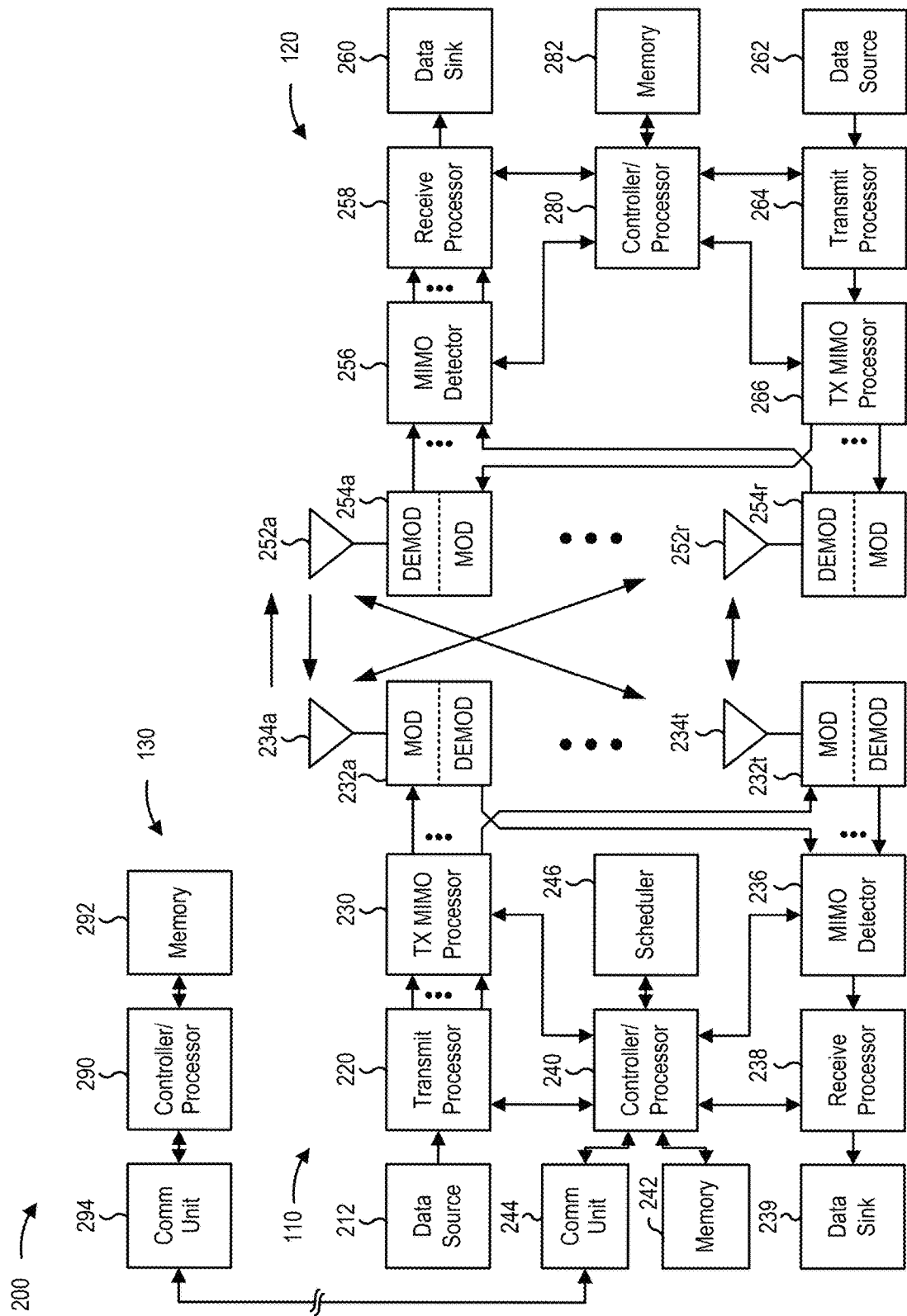
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations 110 and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for non-linearities, as described in more detail elsewhere. For example, the controller/processor 240 of the base station 110, the controller/processor 280 of the UE 120, and/or any other component(s) of FIG. 2 may perform or direct operations of, for example, the processes of FIGS. 6-8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for skipping, means for polar decoding, means for transmitting, means for rate matching, and means for polar coding. Such means may include one or more components of the UE 120 or base station 110 described in connection with FIG. 2.

As indicated above, FIG. 2 is provided merely as an example. Other examples may differ from what is described with regard to FIG. 2.

Piggyback downlink control information (DCI) on PDSCH has been proposed to reduce physical downlink control channel (PDCCH) monitoring occasions. It can be applied on dynamic PDSCH as well as semi-persistently scheduled (SPS) PDSCH. When piggyback DCI is applied to a SPS PDSCH, there is no downlink (DL) grant for the SPS PDSCH. Thus piggyback DCI may be configured by the RRC configuration for the SPS PDSCH. However, the number of component DCIs is dynamic, while RRC configuration is static.

According to aspects of the present disclosure, a two-stage design of piggyback DCI can solve this problem. In these aspects, piggyback DCI is composed of two separately coded parts: a first stage (piggyback downlink control information 1 ($PBDCI_1$)) and a second stage ($PBDCI_2$). The first stage $PBDCI_1$ carries the scheduling information for the second stage PBDCI2. The second stage $PBDCI_2$ carries the component DCIs. The second stage $PBDCI_2$ scales with the number of component DCIs. RRC configuration can carry the scheduling information for the first stage $PBDCI_1$.

The two-stage piggyback DCI design also applies to the dynamic PDSCH case. It has the benefit of reducing changes to the control resource set (CORESET) DCI. In this case, the CORESET DCI carries the scheduling information for the first stage $PBDCI_1$. Because the first stage $PBDCI_1$ has a small size, redundancy is not a concern. The modulation scheme, size, and location (e.g., beta offset) of the first stage $PBDCI_1$ can be configured by RRC signaling. The CORESET DCI is only modified to indicate if PDSCH or the first stage $PBDCI_1$ is present.

Figure 3:
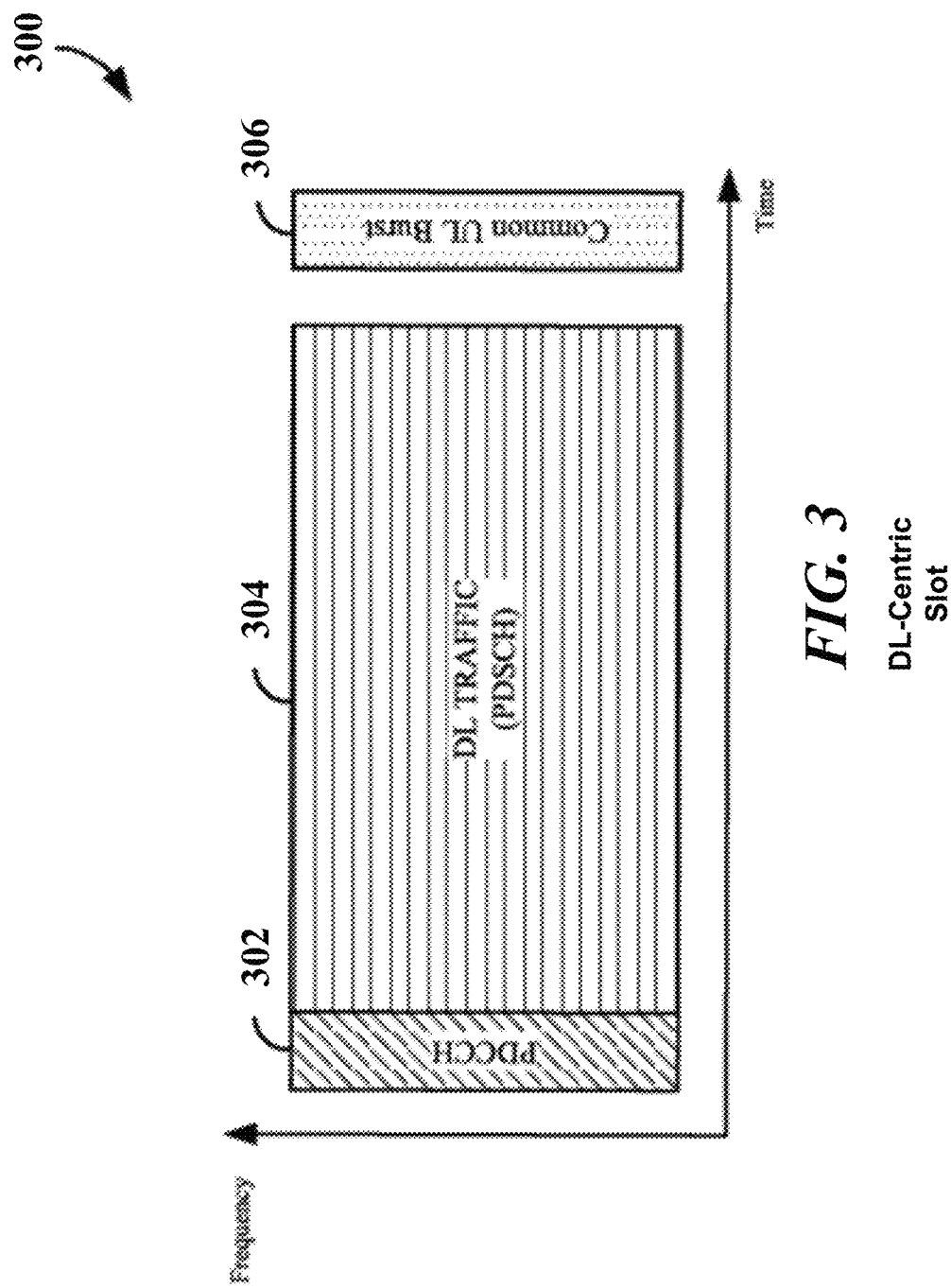
FIG. 3 is a diagram illustrating an example of a downlink (DL)-centric slot, in accordance with various aspects of the present disclosure.

FIG. 3 is a diagram illustrating an example of a downlink (DL)-centric slot 300 according to some aspects of the disclosure. In the example shown in FIG. 3, time is illustrated along a horizontal axis, while frequency is illustrated along a vertical axis. The time-frequency resources of the DL-centric slot 300 may be divided into a DL burst 302, a DL traffic region 304, and an uplink (UL) burst 306.

The DL burst 302 may exist in the beginning portion of the DL-centric slot 300. The DL burst 302 may include any suitable DL information in one or more channels. In some examples, the DL burst 302 may include various scheduling information and/or control information corresponding to various portions of the DL-centric slot 300. In some configurations, the DL burst 302 may be a physical DL control channel (PDCCH), as indicated in FIG. 3. The DL-centric slot 300 may also include a DL traffic region 304. The DL traffic region 304 may sometimes be referred to as the payload of the DL-centric slot 300. The DL traffic region 304 includes the communication resources utilized to communicate DL user data traffic from a scheduling entity (e.g., gNB) to the scheduled entity (e.g., UE). In some configurations, the DL traffic region 304 includes a physical downlink shared channel (PDSCH).

The UL burst 306 includes any suitable UL information in one or more channels. In some examples, the UL burst 306 includes feedback information corresponding to various other portions of the DL-centric slot 300. For example, the UL burst 306 may include feedback information corresponding to the control portion 302 and/or DL traffic region 304. Non-limiting examples of feedback information may include an acknowledgement (ACK) signal, a negative-acknowledgement (NACK) signal, a hybrid automatic repeat request (HARD) indicator, and/or various other suitable types of information. The UL burst 306 may include additional or alternative information, such as information pertaining to random access channel (RACH) procedures, scheduling requests (SRs) (e.g., within a physical uplink control channel (PUCCH)), and various other types of information.

As illustrated in FIG. 3, the end of the DL traffic region 304 may be separated in time from the beginning of the UL burst 306. This time separation may sometimes be referred to as a gap, a guard period, a guard interval, and/or various other suitable terms. This separation provides time for the switch-over from DL communication (e.g., reception operation by the UE) to UL communication (e.g., transmission by the UE). One of ordinary skill in the art will understand that the foregoing is merely one example of a DL-centric slot and alternative structures having similar features may exist without necessarily deviating from the aspects described.

A goal of the DCI piggyback on physical downlink shared channel (PDSCH) is to reduce PDCCH monitoring. Thus, a UE will not have to wake up as frequently, which saves UE power. Reduced PDCCH monitoring is especially important for communications in a higher band (e.g., 60 GHz). The higher band is likely to have a shorter slot duration than frequency range one/frequency range two (FR1 (sub 6 GHz)/FR2 (mmWave)) due to a wider subcarrier spacing (SCS) (e.g., 960 kHz, 1.92 MHz, 3.84 MHz). The number of physical downlink control channel (PDCCH) monitoring occasions will increase, which leads to a high power consumption if all occasions are monitored. Due to the very short slot duration and narrow analog beamforming transmission, the chance of sending multiple downlink control information components (DCIs) to different user equipments (UEs) is greatly reduced compared to FR1/FR2. It is more likely for the gNB to send multiple DCIs to the same UE (in particular for bursty traffic). Piggyback DCI on physical downlink shared channel (PDSCH) may reduce PDCCH monitoring by transmitting control information on the data channel.

Figure 4:
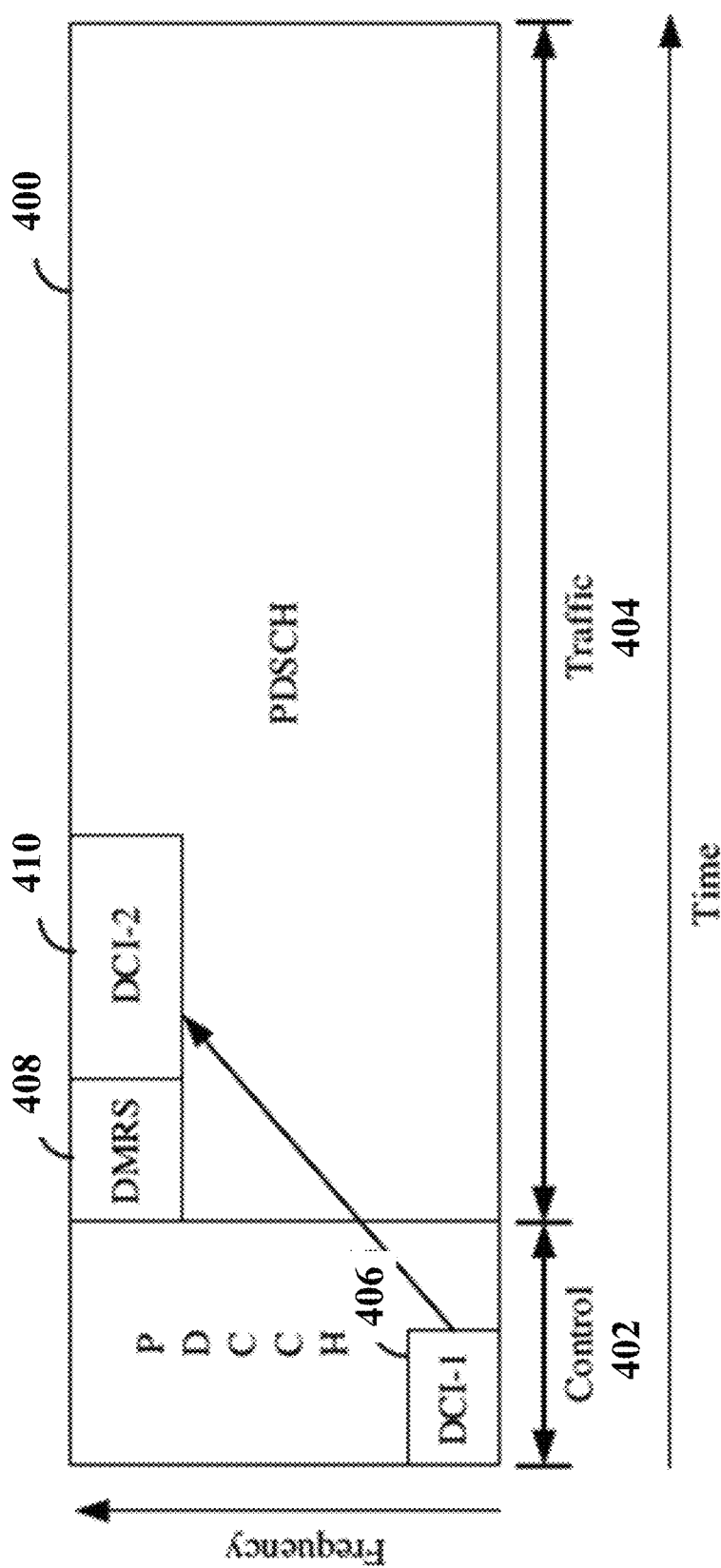
FIG. 4 is a diagram illustrating an example of a time-frequency representation of a slot containing a downlink control information (DCI) piggyback in the physical downlink shared channel (PDSCH), in accordance with various aspects of the present disclosure.

FIG. 4 illustrates an example of a time-frequency representation of a slot 400 including a piggyback DCI for dynamic PDSCH. In the example shown in FIG. 4, time is illustrated along a horizontal axis, while frequency is illustrated along a vertical axis. The time-frequency resource elements of the slot 400 may be divided into a control region 402 and a downlink traffic region 404. In some examples, the slot 400 is a DL-centric slot and the control region 402 is a DL burst of the DL-centric slot. Within the DL burst 402, various control information, including a physical downlink control channel (PDCCH) carrying downlink control information (DCI) for one or more scheduled entities, may be transmitted. Within the downlink traffic region 404, a physical downlink shared channel (PDSCH) carrying user data traffic for one or more scheduled entities may be transmitted. Although not illustrated, the slot 400 may further include an uplink (UL) burst after the PDSCH.

In various aspects of the disclosure, the DCI of a PDCCH may be split into a first DCI control portion (DCI-1 or CORESET DCI or $DCI_{CORESET}$) 406 and a second DCI control portion (DCI-2 or $DCI_{PDSCH}$) 410. The DCI-1 406 may be transmitted within the DL burst 402 of the slot 400, while the DCI-2 410 may be transmitted within the downlink traffic region 404 of the slot 400. Thus, the DCI-2 410 may be time division multiplexed and/or frequency division multiplexed with downlink user data traffic within the downlink traffic region 404 of the slot 400. The DCI-1 406 may include piggyback control information providing information about the DCI-2 410. In some examples, the piggyback control information may indicate the number of resource elements (size) of the DCI-2 410. The piggyback control information may further indicate the location (e.g., starting resource element) and code rate of the DCI-2 410. Thus, the DCI-1 406 within the DL burst 402 of the slot 400 may point to the DCI-2 410 within the downlink traffic region 404 of the slot 400. The DCI-1 406 may indicate a regular grant as well. Also, each DCI-2 410 indicates a regular grant.

Figure 5:
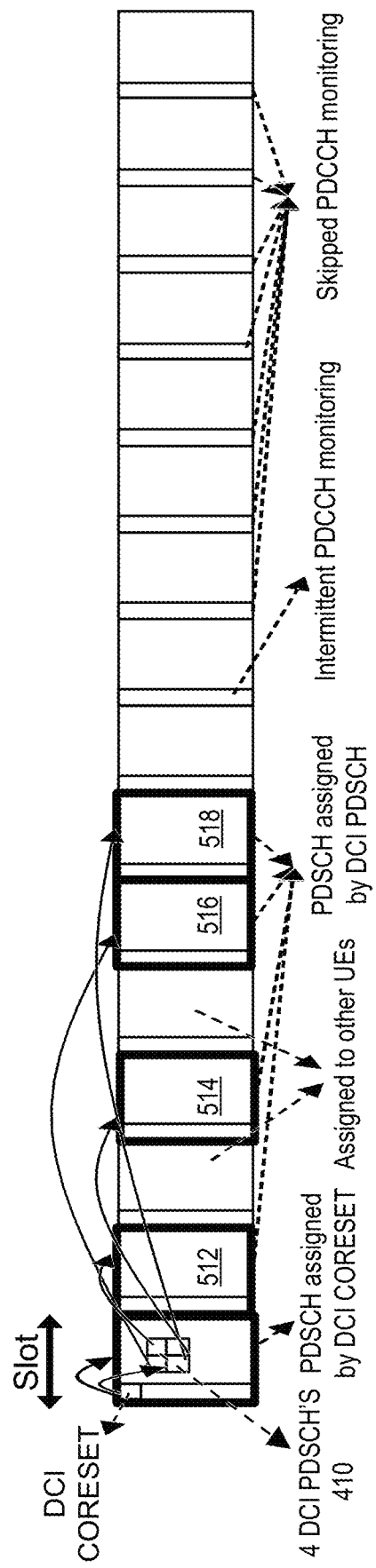
FIG. 5 is a diagram illustrating an example timeline of piggyback downlink control information (DCI), in accordance with aspects of the present disclosure.

FIG. 5 illustrates a timeline of the piggyback DCIs shown in FIG. 4. In FIG. 5, PDSCHs 512, 514, 516, 518 assigned by the downlink grants from the DCI-2 410 ($DCI_{PDSCH}$) are illustrated. In the example of FIG. 5, there are four DCI-2 components ($DCI_{PDSCH}$), each including a downlink grant for a subsequent PDSCH 512, 514, 516, 518.

Figure 6:
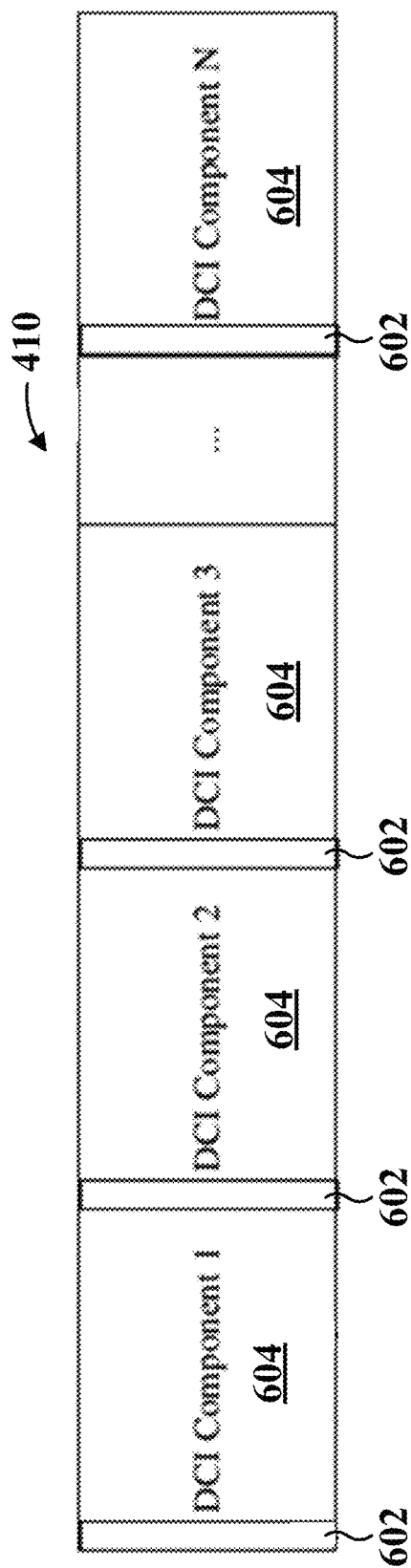
FIG. 6 is a diagram illustrating an example of a second downlink control information (DCI) portion carrying control information, in accordance with various aspects of the present disclosure.

The number of DCIs is relatively dynamic. In the example of FIG. 5, four component DCIs are present. As seen in FIG. 6, even more DCIs can be present. FIG. 6 is a diagram illustrating an example of a second DCI portion (DCI-2) 410 carrying control information. As shown in FIG. 6, the second DCI portion 410 may be a single codeword that includes a concatenation of multiple downlink channel information (DCI) components 604 (e.g., DCI Component 1 . . . DCI Component N). That is, FIG. 5 shows four components, whereas FIG. 6 show N component DCIs. Each DCI component 604 may include scheduling assignments (e.g., downlink assignments and/or uplink grants) for one or more scheduled entities. Thus, each DCI component 604 is a separate DCI intended for one or more scheduled entities. In some examples, the DCI components 604 containing uplink grants may correspond to frequency division duplexed uplink grants within the duration of the current slot or time division duplexed uplink grants within subsequent slots. In some examples, the DCI components 604 containing downlink assignments may correspond to downlink assignments within the same current slot or subsequent slots or may correspond to downlink assignments that span multiple slots (e.g., a multi-slot downlink assignment).

The DCI components 604 may be separated by headers 602, with each header containing a UE ID type field identifying the scheduled entity or group of scheduled entities intended to receive the DCI component 604 following the header 602.

Although the number of component DCIs is dynamic, radio resource control (RRC) configuration and DCI activation for semi-persistent signaling (SPS) is relatively static. There is mismatch for using RRC configuration and DCI activation for SPS to carry the number of component DCIs. To address the mismatch, according to aspects of the present disclosure, a DCI has two "separately coded" parts. The separately coded parts enable the UE to be more dynamically informed about the number of component DCIs in the piggyback. Moreover, because SPS-PDSCH does not have downlink scheduling DCI, piggyback DCI cannot be scheduled by DCI, and thus is configured statically, as discussed in more detail with respect to FIG. 7.

Figure 7:
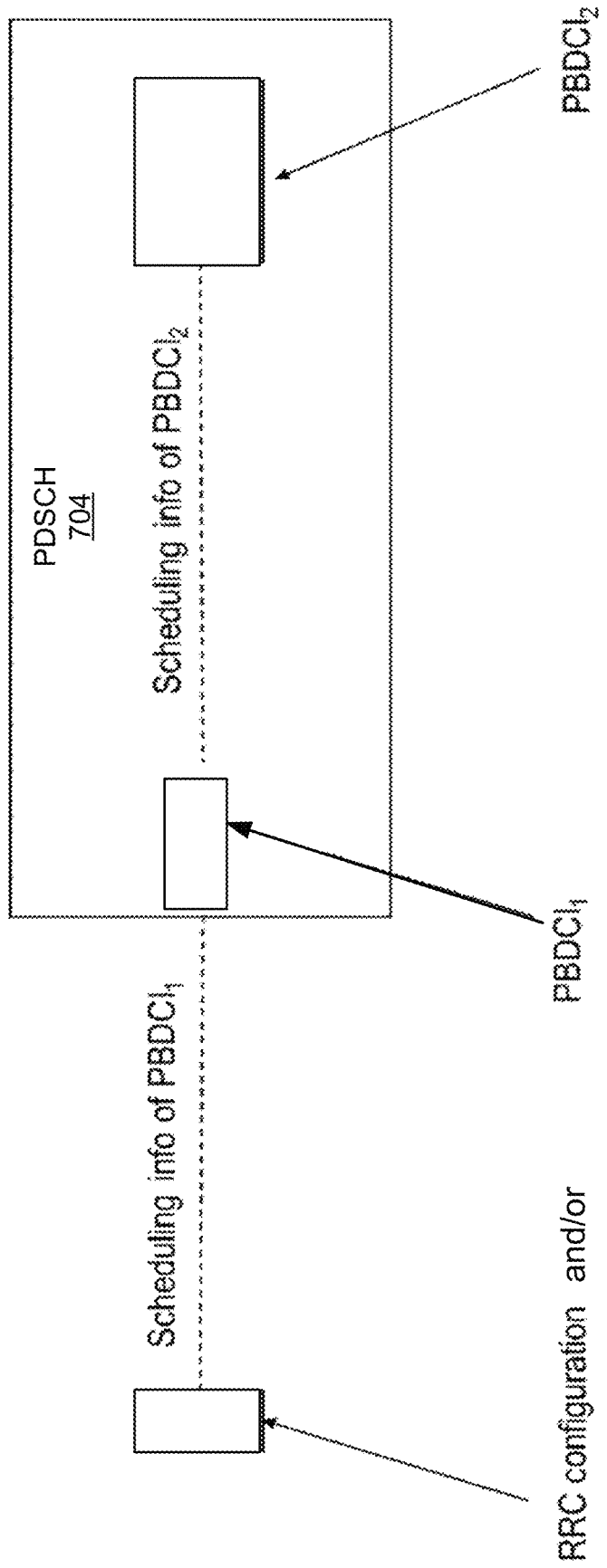
FIG. 7 is a block diagram illustrating two-stage piggyback downlink control information (DCI), in accordance with aspects of the present disclosure.

FIG. 7 is a block diagram illustrating two-stage piggyback DCI, in accordance with aspects of the present disclosure. The two-stage piggyback DCI may be the DCI-2 410 of FIG. 4, split into two stages. The first stage (PBDCI$_1$) is within a PDSCH 704. The first stage (PBDCI$_1$) carries scheduling information for the second stage (PBDCI$_2$), which is also within the PDSCH 704. The second stage (PBDCI$_2$) carries the component DCIs. The second stage (PBDCI$_2$) scales with the number of component DCIs, which corresponds to an amount of traffic to be carried. By separately coding the two stages, the first stage (PBDCI$_1$) can be decoded before the second stage (PBDCI$_2$) is decoded. In one configuration, the first and second stages are separately polar coded.

The first stage (PBDCI$_1$) indicates a number of component DCIs in the second stage (PBDCI$_2$). The first stage (PBDCI$_1$) also contains a modulation scheme for the component DCIs in the second stage (PBDCI$_2$). The first stage (PBDCI$_1$) indicates a resource allocation for the second stage (PBDCI$_2$). The resource allocation includes, for example, a size and location (e.g., beta offset) of the component DCIs in the second stage (PBDCI$_2$).

RRC signaling carries scheduling configuration for the first stage (PBDCI$_1$). For example, the RRC signaling contains the modulation scheme and the resource allocation (e.g., beta offset) of the first stage (PBDCI$_1$). DCI activation for SPS disables and enables the first stage (PBDCI$_1$). The RRC signaling may operate in conjunction with the DCI activation for SPS, or they may operate separately.

In some aspects of the present disclosure, the base station rate matches the PDSCH around the resources for the first and second stages (PBDCI$_1$ and PBDCI$_2$). Thus, the UE skips those resources when decoding PDSCH.

Figure 8:
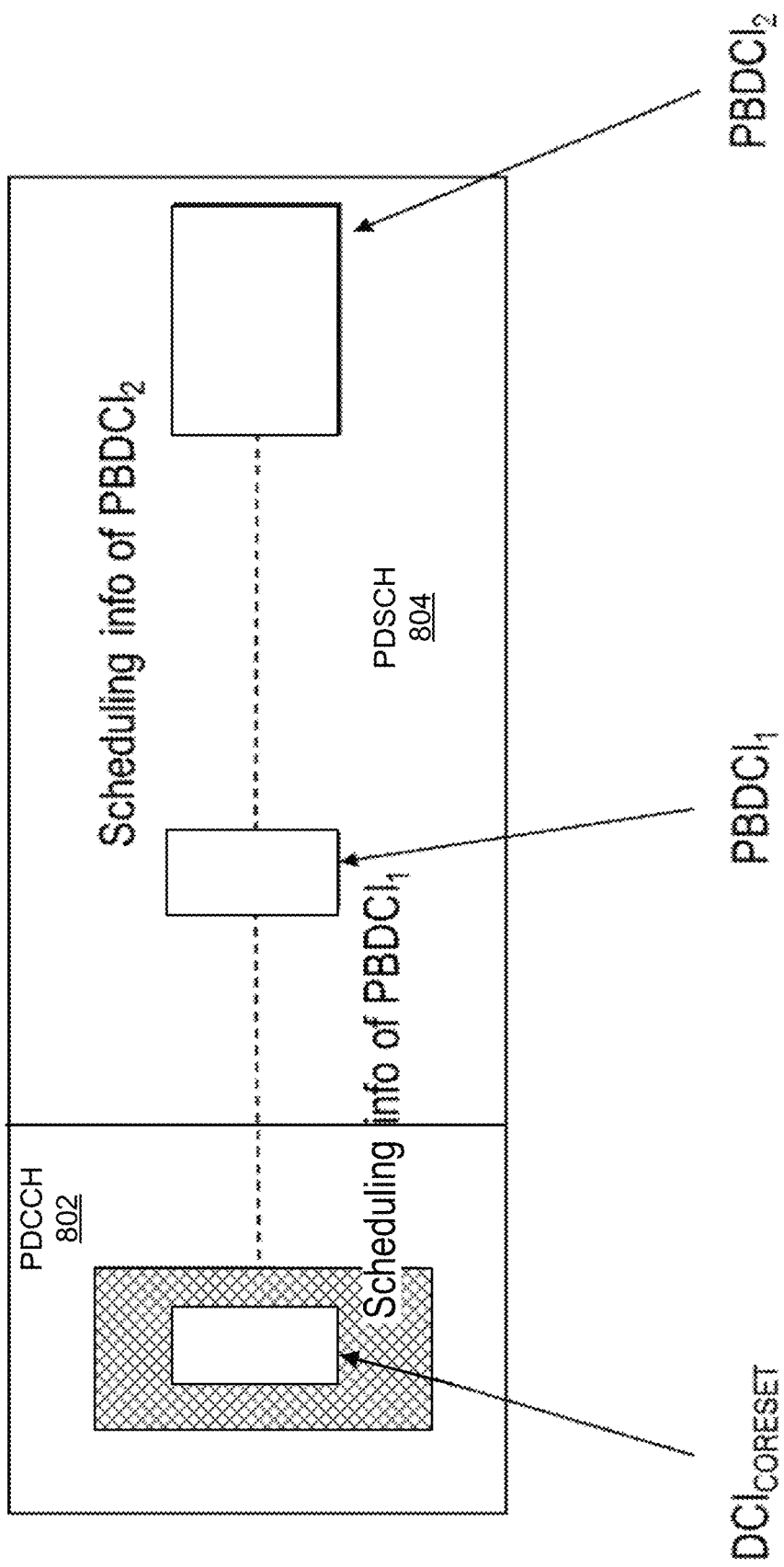
FIG. 8 is a block diagram illustrating two-stage piggyback downlink control information (DCI), in accordance with other aspects of the present disclosure.

FIG. 8 is a block diagram illustrating a two-stage piggyback DCI for dynamic PDSCH, in accordance with aspects of the present disclosure. The DCI-2 410 of FIG. 4 may be split into two parts PBDCI$_1$ and PBDCI$_2$, as seen in FIG. 8. A PDCCH region 802 includes a CORESET DCI (DCI$_{CORESET}$). The CORESET DCI carries the scheduling information of a first stage (PBDCI$_1$) within a PDSCH region 804. Because the first stage (PBDCI$_1$) has a small payload, redundancy is not a concern for overhead. Modulation and size/location (e.g., beta offset) may be configured by RRC signaling. The DCI CORESET includes few modifications. The DCI CORESET indicates the presence of piggyback DCI and PDSCH.

As indicated above, FIGS. 3-8 are provided as examples. Other examples may differ from what is described with respect to FIGS. 3-8.

Figure 9:
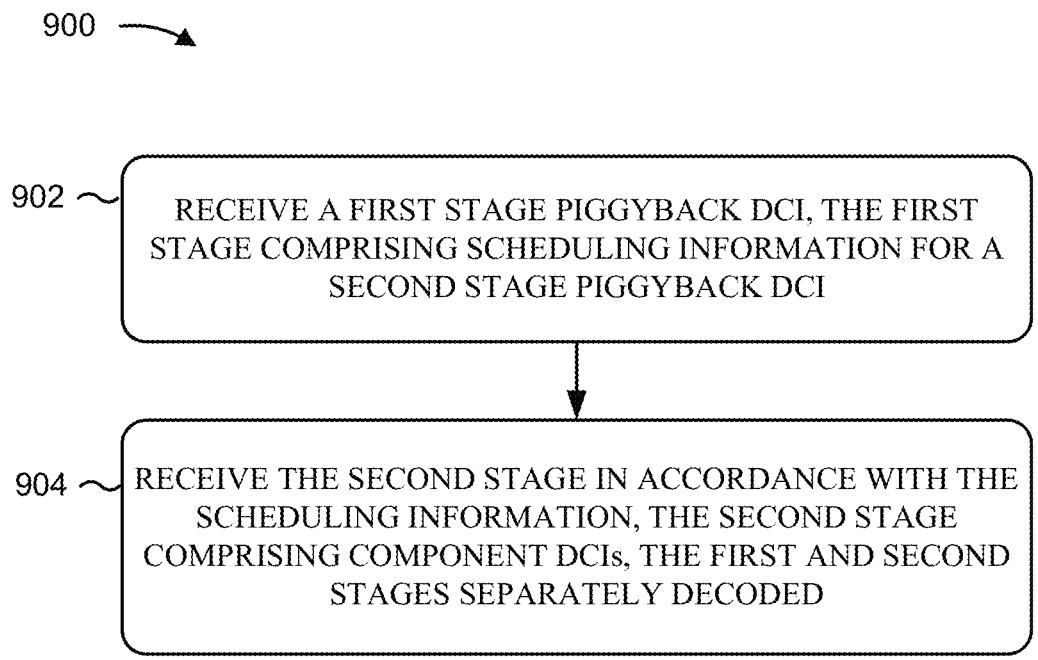
FIG. 9 is a flow diagram illustrating an example process performed, for example, by a user equipment (UE), in accordance with various aspects of the present disclosure.

FIG. 9 is a flow diagram illustrating an example process 900 performed, for example, by a UE, in accordance with various aspects of the present disclosure. The example process 900 is an example of receiving two-stage piggyback downlink control information (DCI).

As shown in FIG. 9, in some aspects, the process 900 may include receiving a first stage of piggyback DCI, the first stage comprising scheduling information for a second stage of piggyback DCI (block 902). For example, the UE (e.g., using the antenna 252, DEMOD 254, MIMO detector 256, receive processor 258, controller/processor 280, memory 282, and/or the like) can receive the first stage piggyback DCI. The UE may receive an RRC (radio resource control) configured schedule for the first stage. The RRC configured schedule may comprise a modulation scheme of the first stage and a size and location of the first stage. In other implementations, the UE may receive DCI activation for SPS (semi-persistent scheduling) for the first stage. The DCI activation for SPS enables and disables the first stage. In still other implementations, the UE may receive a DCI control resource set (CORESET) carrying scheduling information for the first stage. The DCI CORESET indicates a presence of the first stage piggybacked on a physical downlink shared channel (PDSCH).

As shown in FIG. 9, in some aspects, the process 900 may include receiving the second stage in accordance with the scheduling information, the second stage comprising component DCIs. The first and second stages are separately decoded (block 904). For example, the UE (e.g., using the antenna 252, DEMOD 254, MIMO detector 256, receive processor 258, controller/processor 280, memory 282, and/or the like) can receive the second stage in accordance with the scheduling information. In some aspects, the UE separately polar decodes the first stage and the second stage. The UE may skip piggybacked DCI resources occupied by the first stage and the second stage when decoding a physical downlink shared channel (PDSCH).

Figure 10:
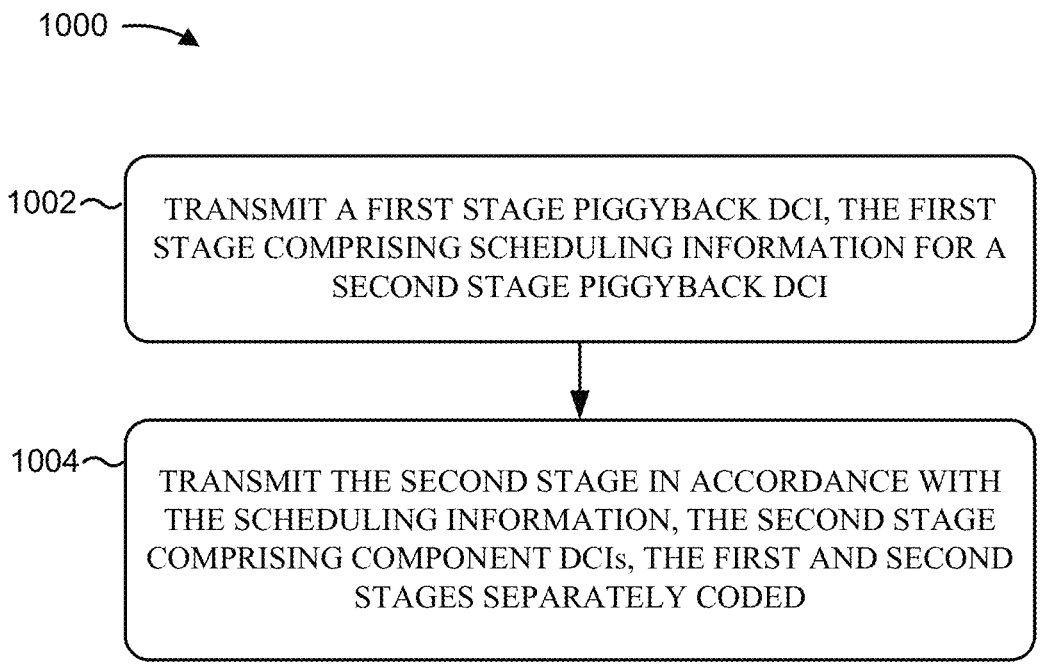
FIG. 10 is a flow diagram illustrating an example process performed, for example, by a base station, in accordance with various aspects of the present disclosure.

FIG. 10 is a flow diagram illustrating an example process 1000 performed, for example, by a base station, in accordance with various aspects of the present disclosure. The example process 1000 is an example of transmitting two-stage piggyback downlink control information (DCI).

As shown in FIG. 10, in some aspects, the process 1000 may include transmitting a first stage of piggyback DCI, the first stage comprising scheduling information for a second stage of piggyback DCI (block 1002). For example, the base station (e.g., using the antenna 234, MOD 232, TX MIMO processor 230, transmit processor 220, controller/processor 240, memory 242, and/or the like) can transmit the first stage piggyback DCI. The base station may transmit an RRC (radio resource control) configured schedule for the first stage. The RRC configured schedule may comprises a modulation scheme of the first stage and a size and location of the first stage. In other implementations, the base station may transmit DCI activation for SPS (semi-persistent scheduling) for the first stage. The base station may transmit a DCI control resource set (CORESET) carrying scheduling information for the first stage. The DCI CORESET indicates a presence of the first stage piggybacked on a physical downlink shared channel (PDSCH).

As shown in FIG. 10, in some aspects, the process 1000 may include transmitting the second stage in accordance with the scheduling information. The second stage includes component DCIs. The first and second stages are separately coded (block 1004). For example, the base station (e.g., using the antenna 234, MOD 232, TX MIMO processor 230, transmit processor 220, controller/processor 240, memory 242, and/or the like) can transmit the second stage in accordance with the scheduling information. The base station may separately polar code the first stage and the second stage. The base station may rate match a physical downlink shared channel (PDSCH) around DCI resources occupied by the first stage and the second stage.

Implementation examples are described in the following numbered clauses.

1. A method of wireless communication by a user equipment (UE), comprising:
   receiving a first stage of piggyback downlink control information (DCI), the first stage comprising scheduling information for a second stage of piggyback DCI; and
   receiving the second stage in accordance with the scheduling information, the second stage comprising component DCIs, the first stage and second stage separately decoded.
2. The method of clause 1, further comprising receiving a radio resource control (RRC) configured schedule for the first stage.
3. The method of clause 1 or 2, in which the RRC configured schedule comprises a modulation scheme of the first stage and a size and location of the first stage.
4. The method of any of the preceding clauses, further comprising receiving DCI activation for semi-persistent scheduling (SPS) for the first stage.
5. The method of any of the preceding clauses, in which the DCI activation for SPS enables and disables the first stage.
6. The method of any of the preceding clauses, in which the first stage further comprises a quantity of the component DCIs, a modulation scheme for the component DCIs and a size and location of the component DCIs.
7. The method of any of the preceding clauses, further comprising separately polar decoding the first stage and the second stage.
8. The method of any of the preceding clauses, further comprising skipping piggybacked DCI resources occupied by the first stage and the second stage when decoding a physical downlink shared channel (PDSCH).
9. The method of any of the preceding clauses, further comprising receiving a DCI control resource set (CORESET) carrying scheduling information for the first stage, the DCI CORESET indicating a presence of the first stage piggybacked on a physical downlink shared channel (PDSCH).
10. A method of wireless communication by a base station, comprising:
    transmitting a first stage of piggyback downlink control information (DCI), the first stage comprising scheduling information for a second stage of piggyback DCI; and
    transmitting the second stage in accordance with the scheduling information, the second stage comprising component DCIs, the first stage and second stage separately coded.
11. The method of clause 10, further comprising transmitting a radio resource control (RRC) configured schedule for the first stage.
12. The method of clause 10 or 11, in which the RRC configured schedule comprises a modulation scheme of the first stage and a size and location of the first stage.
13. The method of any of the clauses 10-12, further comprising transmitting DCI activation for semi-persistent scheduling (SPS) for the first stage.
14. The method of any of the clauses 10-13, in which the DCI activation for SPS enables and disables the first stage.
15. The method of any of the clauses 10-14, in which the first stage further comprises a quantity of the component DCIs, a modulation scheme for the component DCIs and a size and location of the component DCIs.
16. The method of any of the clauses 10-15, further comprising separately polar coding the first stage and the second stage.
17. The method of any of the clauses 10-16, further comprising rate matching a physical downlink shared channel (PDSCH) around DCI resources occupied by the first stage and the second stage.
18. The method of any of the clauses 10-17, further comprising transmitting a DCI control resource set (CORESET) carrying scheduling information for the first stage, the DCI CORESET indicating a presence of the first stage piggybacked on a physical downlink shared channel (PDSCH).
19. A user equipment (UE) for wireless communication, comprising:
    a memory, and
    at least one processor operatively coupled to the memory, the memory and the at least one processor configured:
        to receive a first stage of piggyback downlink control information (DCI), the first stage comprising scheduling information for a second stage of piggyback DCI; and
        to receive the second stage in accordance with the scheduling information, the second stage comprising component DCIs, the first stage and second stage separately decoded.
20. The UE of clause 19, in which the at least one processor is further configured to receive a radio resource control (RRC) configured schedule for the first stage.
21. The UE of clause 19 or 20, in which the RRC configured schedule comprises a modulation scheme of the first stage and a size and location of the first stage.
22. The UE of any of the clauses 19-21, in which the at least one processor is further configured to receive DCI activation for semi-persistent scheduling (SPS) for the first stage.
23. The UE of any of the clauses 19-22, in which the DCI activation for SPS enables and disables the first stage.
24. The UE of any of the clauses 19-23, in which the first stage further comprises a quantity of the component DCIs, a modulation scheme for the component DCIs and a size and location of the component DCIs.
25. The UE of any of the clauses 19-24, in which the at least one processor is further configured to separately polar decode the first stage and the second stage.
26. The UE of any of the clauses 19-25, in which the at least one processor is further configured to skip piggybacked DCI resources occupied by the first stage and the second stage when decoding a physical downlink shared channel (PDSCH).
27. The UE of any of the clauses 19-26, in which the at least one processor is further configured to receive a DCI control resource set (CORESET) carrying scheduling information for the first stage, the DCI CORE- SET indicating a presence of the first stage piggybacked on a physical downlink shared channel (PDSCH).

28. A base station for wireless communication, comprising:
    a memory, and
    at least one processor operatively coupled to the memory, the memory and the at least one processor configured:
        to transmit a first stage of piggyback downlink control information (DCI), the first stage comprising scheduling information for a second stage of piggyback DCI; and
        to transmit the second stage in accordance with the scheduling information, the second stage comprising component DCIs, the first stage and second stage separately coded.

29. The base station of clause 28, in which the at least one processor is further configured to polar code the first stage and the second stage separately.

30. The base station of clause 28 or 29, in which the at least one processor is further configured to rate match a physical downlink shared channel (PDSCH) around DCI resources occupied by the first stage and the second stage.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
    receiving first scheduling information for a first stage of piggyback downlink control information (DCI);
    receiving the first stage of piggyback DCI in a physical downlink shared channel (PDSCH) in accordance with the first scheduling information, the first stage comprising second scheduling information for a second stage of piggyback DCI; and
    receiving the second stage of piggyback DCI in the PDSCH in accordance with the second scheduling information, the second stage comprising component DCIs, the first stage and second stage separately decoded.

2. The method of claim 1, further comprising receiving the first scheduling information for the first stage of piggyback DCI via radio resource control (RRC) signaling.

3. The method of claim 2, in which the RRC configured first scheduling information for the first stage of piggyback DCI comprises a modulation scheme of the first stage and a size and location of the first stage.

4. The method of claim 1, further comprising receiving DCI activation for semi-persistent scheduling (SPS) for the first stage.

5. The method of claim 4, in which the DCI activation for SPS enables and disables the first stage.

6. The method of claim 1, in which the first stage indicates a quantity of the component DCIs, a modulation scheme for the component DCIs and a size and location of the component DCIs.

7. The method of claim 1, further comprising separately polar decoding the first stage and the second stage.

8. The method of claim 1, further comprising skipping piggybacked DCI resources occupied by the first stage and the second stage when decoding the PDSCH.

9. The method of claim 1, further comprising receiving a DCI control resource set (CORESET) carrying the first scheduling information for the first stage of piggyback DCI, the DCI CORESET indicating a presence of the first stage piggybacked on the PDSCH.

10. A method of wireless communication by a base station, comprising:
    transmitting first scheduling information for a first stage of piggyback downlink control information (DCI);
    transmitting the first stage of piggyback DCI in a physical downlink shared channel (PDSCH) in accordance with the first scheduling information, the first stage comprising second scheduling information for a second stage of piggyback DCI; and
    transmitting the second stage of piggyback DCI in the PDSCH in accordance with the second scheduling information, the second stage comprising component DCIs, the first stage and second stage separately coded.

11. The method of claim 10, further comprising transmitting the first scheduling information for the first stage of piggyback DCI via radio resource control (RRC) signaling.

12. The method of claim 11, in which the RRC configured first scheduling information for the first stage of piggyback DCI comprises a modulation scheme of the first stage and a size and location of the first stage.

13. The method of claim 10, further comprising transmitting DCI activation for semi-persistent scheduling (SPS) for the first stage.

14. The method of claim 13, in which the DCI activation for SPS enables and disables the first stage.

15. The method of claim 10, in which the first stage indicates a quantity of the component DCIs, a modulation scheme for the component DCIs and a size and location of the component DCIs.

16. The method of claim 10, further comprising separately polar coding the first stage and the second stage.

17. The method of claim 10, further comprising rate matching the PDSCH around DCI resources occupied by the first stage and the second stage.

18. The method of claim 10, further comprising transmitting a DCI control resource set (CORESET) carrying the first scheduling information for the first stage of piggyback DCI, the DCI CORESET indicating a presence of the first stage piggybacked on the PDSCH.

19. A user equipment (UE) for wireless communication, comprising:
   a memory, and
   at least one processor operatively coupled to the memory, the memory and the at least one processor configured:
      to receive first scheduling information for a first stage of piggyback downlink control information (DCI);
      to receive the first stage of piggyback DCI in a physical downlink shared channel (PDSCH) in accordance with the first scheduling information, the first stage comprising second scheduling information for a second stage of piggyback DCI; and
      to receive the second stage of piggyback DCI in the PDSCH in accordance with the second scheduling information, the second stage comprising component DCIs, the first stage and second stage separately decoded.

20. The UE of claim 19, in which the at least one processor is further configured to receive the first scheduling information for the first stage of piggyback DCI via radio resource control (RRC) signaling.

21. The UE of claim 20, in which the RRC configured first scheduling information for the first stage of piggyback DCI comprises a modulation scheme of the first stage and a size and location of the first stage.

22. The UE of claim 19, in which the at least one processor is further configured to receive DCI activation for semi-persistent scheduling (SPS) for the first stage.

23. The UE of claim 22, in which the DCI activation for SPS enables and disables the first stage.

24. The UE of claim 19, in which the first stage indicates a quantity of the component DCIs, a modulation scheme for the component DCIs and a size and location of the component DCIs.

25. The UE of claim 19, in which the at least one processor is further configured to separately polar decode the first stage and the second stage.

26. The UE of claim 19, in which the at least one processor is further configured to skip piggybacked DCI resources occupied by the first stage and the second stage when decoding the PDSCH.

27. The UE of claim 19, in which the at least one processor is further configured to receive a DCI control resource set (CORESET) carrying the first scheduling information for the first stage of piggyback DCI, the DCI CORESET indicating a presence of the first stage piggybacked on the PDSCH.

28. A base station for wireless communication, comprising:
   a memory, and
   at least one processor operatively coupled to the memory, the memory and the at least one processor configured:
      to transmit first scheduling information for a first stage of piggyback downlink control information (DCI);
      to transmit the first stage of piggyback DCI in a physical downlink shared channel (PDSCH) in accordance with the first scheduling information, the first stage comprising second scheduling information for a second stage of piggyback DCI; and
      to transmit the second stage of piggyback DCI in the PDSCH in accordance with the second scheduling information, the second stage comprising component DCIs, the first stage and second stage separately coded.

29. The base station of claim 28, in which the at least one processor is further configured to polar code the first stage and the second stage separately.

30. The base station of claim 28, in which the at least one processor is further configured to rate match the PDSCH around DCI resources occupied by the first stage and the second stage.

* * * * *